Figure 1:
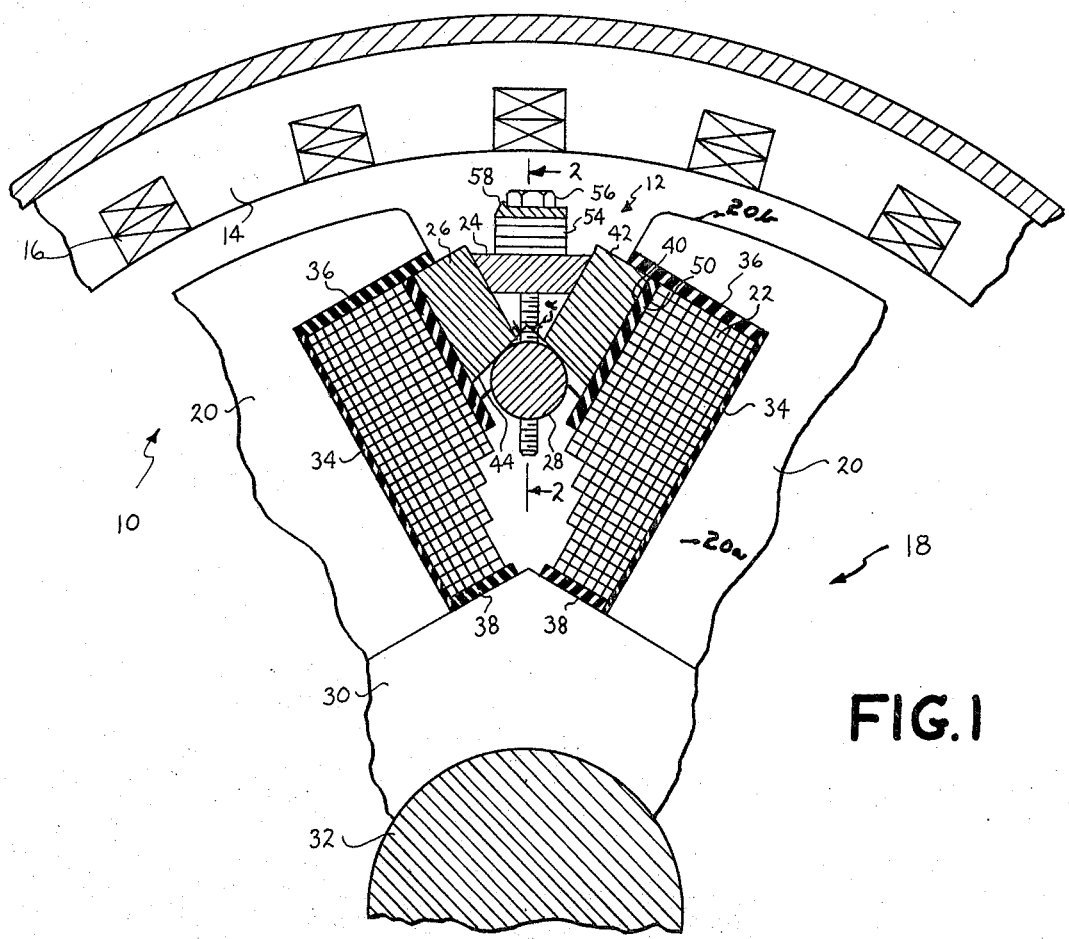

United States Patent [19]
Hallenbeck

[11] 3,766,417
[45] Oct. 16, 1973

[54] SIDE SUPPORT FOR SYNCHRONOUS ROTOR FIELD WINDING
[75] Inventor: Gordon R. Hallenbeck, Amsterdam, N.Y.
[73] Assignee: General Electric Company, Schenectady, N.Y.
[22] Filed: Aug. 11, 1972
[21] Appl. No.: 280,016

[52] U.S. Cl. .................................. 310/214, 310/262
[51] Int. Cl. ............................................ H02k 3/48
[58] Field of Search .................... 310/214, 215, 217, 310/262

[56] References Cited
FOREIGN PATENTS OR APPLICATIONS
541,110  5/1957  Canada .............................. 310/214
848,496  9/1960  Great Britain ..................... 310/214

Primary Examiner—J. D. Miller
Assistant Examiner—Robert J. Hickey
Attorney—Vale P. Myles et al.

[57] ABSTRACT

The coil sides of a synchronous machine salient pole rotor are supported against the centrifugal forces encountered during operation by a coil support characterized by a wedge which is driven between side blocks overlying the coil sides on adjacent poles by screws engaged in a preferably cylindrical nut underlying the radially inner faces of the side blocks. The radially outer faces of the side blocks bear against the pole tips to prevent centrifugal discharge of the coil support while lips are provided along both the side blocks and the insulation situated between the side blocks and the coil sides to prevent axial displacement of the coil support. A plurality of spring washers also are employed between the bolts and wedge to permit control of the tensile forces in the screws by visual inspection of the washers and to maintain the screw tension at a desired value notwithstanding dimensional changes in the coil assembly due, for example, to temperature changes in the coil.

9 Claims, 4 Drawing Figures

SIDE SUPPORT FOR SYNCHRONOUS ROTOR FIELD WINDING

This invention relates to a synchronous machine having a novel coil side support and in particular, to a synchronous machine having a coil side support which is self-locking to permit wedging of the coil support against the coil without machining of the rotor.

During the operation of synchronous machines, centrifugal forces are exerted upon the field winding coils of the salient poles tending to distort the geometry of the coils and a number of various techniques heretofore have been proposed and/or utilized to prevent centrifugal deflection of the coils. For example, one of the more efficient techniques for preventing coil distortion is drawing a wedge-shaped support block radially inward upon insulated bolts secured to the spider, or shaft, of the rotor to lock the support block between the sides of adjacent coils. Such coil side supports, however, not only require machining of the rotor to accept the bolts, but also tend to somewhat restrict air flow between the field coils due to the radial extension of the bolts from the wedge to the spider. Moreover, because of the close proximity of field coils in finished machines, coil supports can only be added to a machine subsequent to manufacture by precise drilling of the rotor. V-shaped separation plates also have been positioned beneath projecting portions of the pole tips to restrain random windings on adjacent poles and to direct air axially between the windings. Such separation plates, however, can be subject to dislodgement unless secured in position by bolts extending into the rotor.

It is therefore an object of this invention to provide a synchronous machine having a coil support which can be locked into position without machining of the rotor components.

It is also an object of this invention to provide a self-locking coil support having a spring bias permitting tension in the screws driving the wedge between the coils to be visually observed during installation of the coil support.

It is a further object of this invention to provide a synchronous machine having a self-locking coil support which can be readily added to a machine subsequent to manufacture without provisions for a coil support.

It is a still further object of this invention to provide a coil support which permits enhanced air flow between the radially inner coil faces.

It is a still further object of this invention to provide a coil support which facilitates manufacture of a synchronous machine.

These and other objects of this invention generally are achieved in a synchronous machine by the use of a coil support having angularly disposed side blocks juxtaposed with confronting sides of coils wrapped around adjacent poles and means disposed in bearing contact with each of the side blocks to draw the wedge between first angularly disposed surfaces of the side blocks by the application of force to a second angularly disposed surface of the side blocks. Thus, a synchronous machine in accordance with this invention generally would include a stator, a rotor having a plurality of salient poles disposed around its peripheral surface and a field coil wrapped around the body of each pole underlying the pole tip. The machine also would include a coil support for restraining movement of the coil under centrifugal loading characterized by a pair of angularly disposed side blocks having an elongated face juxtaposed with confronting sides of adjacent coils and a shorter face juxtaposed with the tips of the salient poles. A wedge is disposed between the side blocks in contact with the face of the side blocks opposite the elongated face and means are disposed in bearing contact with each of said side blocks for pulling the wedge radially inward between the side blocks to tightly position the elongated faces of the side blocks against the coil sides of adjacent poles. Preferably, the coil support also includes spring biasing means disposed between the wedge pulling means and the wedge to permit control of the tensile force upon screws driving the wedge between the side blocks and to prevent loosening of the wedge due to dimensional changes in the coils during operation.

Figure 2:
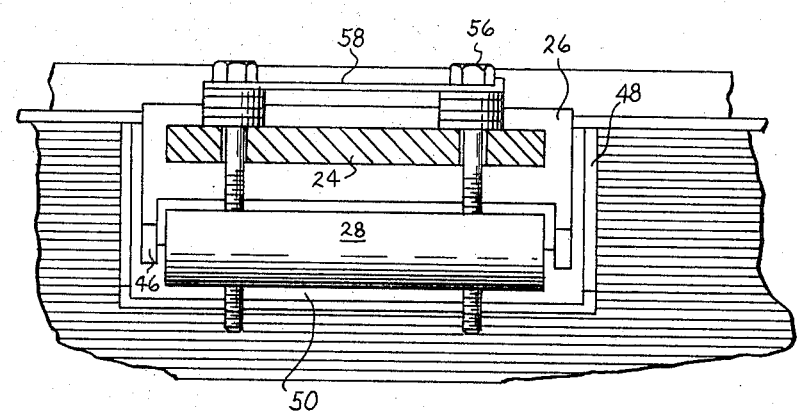
Figure 3:
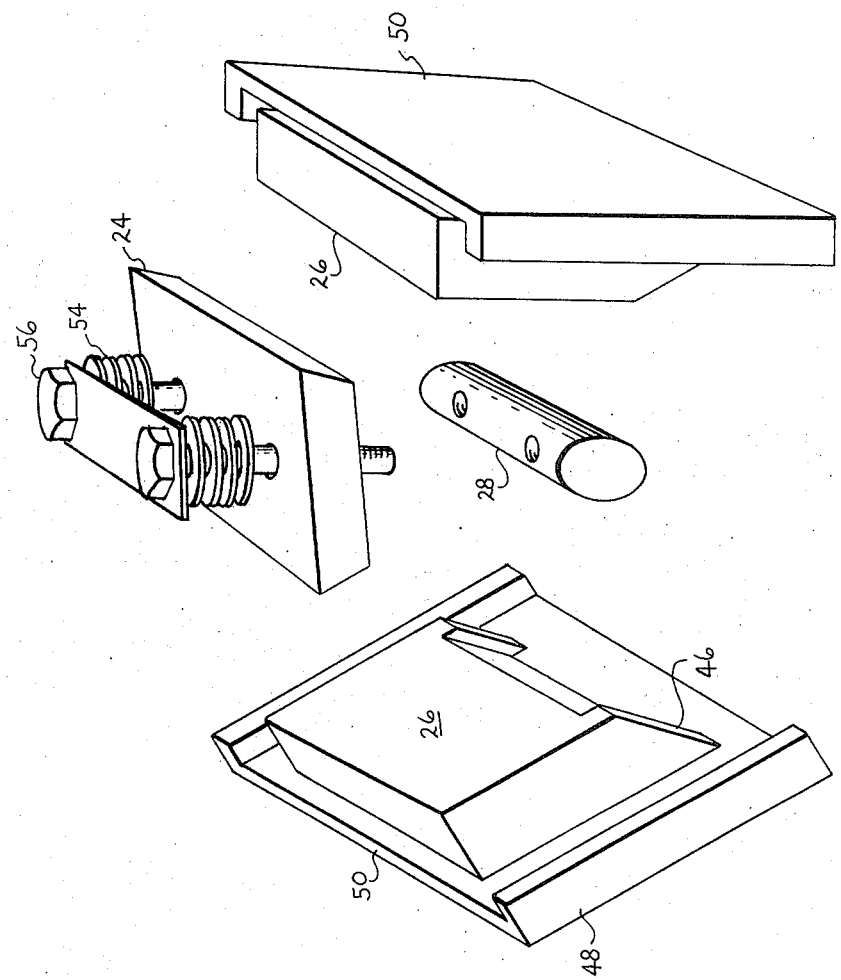
Figure 4:
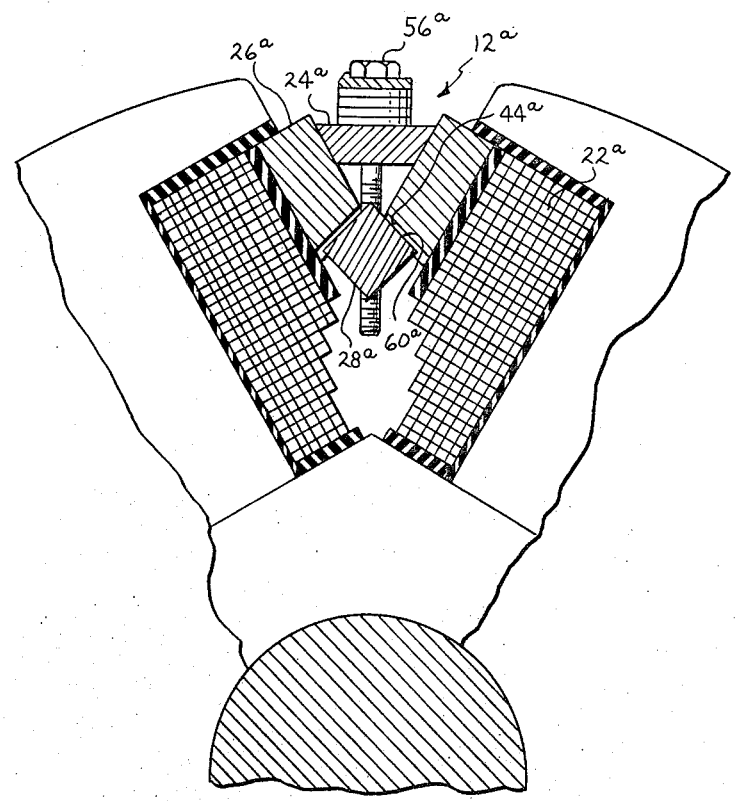

Although this invention is described with particularity in the appended claims, a more complete understanding of the invention may be obtained from the following detailed description of specific embodiments of this invention when taken in conjunction with the appended drawings wherein:

FIG. 1 is a view taken along the shaft axis of the coil support in a machine mounted position, FIG. 2 is a sectional view taken along lines 2—2 of FIG. 1, FIG. 3 is an exploded isometric view of the coil support of FIG. 1, and FIG. 4 is a view of an alternate embodiment of this invention wherein a square nut is utilized to draw the wedge into position.

A synchronous motor 10 having a coil support 12 in accordance with this invention is illustrated in FIGS. 1–2 and generally comprises a stator 14 having winding 16 therein circumferentially disposed about a rotor 18 having a plurality of radially extending poles 20 mounted along the periphery thereof. A field coil 22 is wound about each field pole and the adjacent sides of the coils are restrained by a self-locking coil support 12 not requiring a threaded bore in the rotor, i.e., wedge 24 of the coil support is drawn radially inward between side blocks 26 by cylindrical nut 28 which forms a part of the coil support.

Other than coil support 12, th illustrated synchronous motor is conventional in design and includes a plurality of salient poles 20, preferably in excess of six to limit the centrifugal forces exerted upon the coil support during operation, extending radially outward from spider 30 mounted upon shaft 32. Field coil 22 is wrapped circumferentially about the bodies 20a of the poles in an underlying position relative to pole tips 20b while the radially inner portion of the field coil, identified by reference numeral 22a, is set back in conventional fashion to maximize the amount of copper in each coil without interference with an adjacent coil. To inhibit shorting of the field coils to the poles, an insulating layer 34, typically of mica or silicone mica, is positioned between the field winding and the pole body while top and bottom collars 36 and 38 of an insulating material such as polyester glass or silicone glass, is disposed between the field coil and the pole tips and spider, respectively. While field coil 22 is illustrated in the FIGURES as being wound with rectangular conductors set back in step fashion proximate the rotor spider, it will be appreciated that other conventional types of winding, e.g., random winding, also can be utilized with synchronous machines having the bracing system of this invention.

Coil support 12 employed to maintain the field coils in position preferably includes a pair of trapezoidal side blocks 26 disposed with elongated faces 40 of the blocks bearing against the sides of adjacent coils. The radially outer faces 42 of the side blocks are positioned against insulating collar 36 adjacent the pole tips while the radially inner faces 44 of the trapezoidal shaped side blocks serve as a bearing surface for cylindrical nut 28. To assure self-positioning of the cylindrical nut, the radially inner faces of the side blocks should be tapered at an included angle, i.e., an angle $\alpha$ between inner faces 44, less than 90°. In general, the included angle between the inner faces of the side blocks preferably should be approximately equal, i.e., $\pm 5°$, to the angular disposition of elongated faces 40 positioned against the coil sides. Because the angular dispositions of side blocks 26 are determined by the number of radially extending poles in the rotor, it will be apparent that the angular disposition of radially inner faces 44 (as well as other factors such as the size of the screws, etc.), will vary dependent upon the number of poles in the machine. For a 12 pole machine, however, the side blocks normally are disposed at an angle of 60° and the inner faces of the side blocks will subtend an angle of 60°.

As can be seen more clearly from FIGS. 2 and 3, radially inward protruding lips 46 are provided at each end of each side block to prevent axial movement of cylindrical nut 28 while axial motion of the side blocks is inhibited by lips 48 extending outwardly from axially opposite ends of coil protector 50 fixedly secured, e.g., by an epoxy resin adhesive, to the coil sides to insulate the coil sides from the side blocks.

Wedge 24 also is trapezoidally shaped with non-parallel faces 52 of the wedge being tapered parallel to the adjacent faces of side blocks 26. A plurality of spring washers 54 are provided between the hexagon head of cap screws 56 and wedge 24 while locking plate 58 extends between the cap screws to prevent loosening of the screws. Spring washers 54 are of conventional design, i.e., washers having a known compression for a given load, and permit the tensile forces in the cap screws to be accurately predicted and controlled by selecting a washer configuration which will flatten when the desired load is applied to the cap screws. The spring washers also serve to maintain screw tension during running of the motor should dimensional changes occur in the field coil due to overtemperature operation of the coil, overspeed of the motor, et cetera. While a single screw could be utilized within the coil support of this invention, a plurality of axially displaced cap screws are preferred to distribute the load between the cap screws and permit the use of axially elongated coil supports.

Preferably, wedge 24 and side blocks 26 are fabricated of extruded aluminum to minimize the centrifugal force exerted upon the coil support while the remaining components, i.e., nut 28, cap screw 56, spring washers 54 and locking plate 58, are steel to provide the tensile strength desired for those components.

Side blocks 26 preferably extend over a majority, and preferably substantially all, the radial length of the coil sides parallel to the pole body. The axial length and the number of coil suports employed in a given machine, however, will vary dependent primarily upon the speed of the machine. For example, an eight pole synchronous machine may utilize a 15 inch span between coil supports approximately 3 inches in axial length while a 12 pole machine may have a span of approximately 22.5 inches between three inch long supports. The span between supports and the number of supports required for a coil are determined in known fashion by calculating the stress in the copper coil as a solid beam and placing a maximum allowable limit on the permissible stress. In general, it is preferred that side blocks 26 extend over a minimum of the linear surface of the coil sides to maximize the surface of field coil 22 in contact with air flowing through the machine.

To position coil support 12 within the motor, coil protectors 50 are secured to the outer coil sides remote from the pole and the side blocks of the support is positioned adjacent the coil protectors. Cap screws 56 then are tightened to seat the side blocks in the corner formed by top collars 36 and the coil protector while further tightening of the screws draws wedge 24 radially inward between the side blocks to apply a sideward force against adjacent coil sides. By the proper selection of spring washers 54, the washers can be made to flatten at the desired side pressure upon the side blocks and inadvertent injury to the coil side is foreclosed.

While nut 28 preferably is cylindrical because of the self-positioning characteristic of cylindrical nuts inhibiting contact between the nut and a single side block, the nut also could have a square or diamond shaped cross-section as is illustrated in FIG. 4. Except for the geometric configuration of FIG. 28a, coil support 12a of FIG. 4 is identical to the coil support 12 illustrated in FIGS. 1–3 with cap screws 56a being engaged in the nut to draw wedge 24a between side block 26a to apply the desired pressure to the sides of field coils 22a. Faces 60a of diamond shaped nut 28a preferably are tapered at an angle equal to the taper of radially inner faces 44a of the side blocks to equalize the distribution of load across the radially inner faces of the side blocks.

While several examples of this invention have been shown and described, it will be apparent to those skilled in the art that many changes may be made without departing from this invention in its broader aspects; the appended claims therefore are intended to cover all such changes and modifications as fall within the true spirit and scope of this invention.

What I claim as new and desire to secure by Letters Patent of the United States is:

1. In a synchronous electric machine including a hollow stator and an axially disposed rotor rotatably mounted within said stator, said rotor having a plurality of salient poles circumferentially disposed around its periphery, each of said poles having a field coil wrapped around a radially extending body portion thereof and each of said coils being disposed in underlying relationship to a pole tip portion of the pole on which it is wrapped; the improvement comprising a plurality of coil side supports each mounted, respectively, between adjacent field coils for restraining movement of said coils in response to centrifugal loading, each of said coil side supports comprising a pair of angularly disposed side blocks, each of said side blocks having an elongated face juxtaposed with a confronting side of a coil wrapped around one of the salient poles, each of said blocks further having a relatively shorter face juxtaposed with and underlying a tip of said one of the salient poles, a wedge disposed between said pair of side blocks in contact with faces thereof opposite the respective coil sides that are confronted by the elongated faces of said blocks, and means disposed in bearing contact with a radially inner face of each of said side blocks for pulling said wedge radially between said pair of blocks to tightly position said elongated faces against the coil sides wrapped about the adjacent poles.

2. A synchronous machine according to claim 1 wherein said wedge pulling means includes a screw passing radially through said wedge and a nut threaded upon said screw, said nut bearing against the radially inner faces of said side blocks remote from said pole tips.

3. A synchronous machine according to claim 2 wherein said wedge pulling means further includes spring biasing means disposed between said screw and said wedge.

4. A synchronous machine according to claim 3 wherein said nut is cylindrically shaped to produce a tangential contact between the nut and the radially inner faces of said side blocks.

5. A synchronous machine according to claim 2 wherein the included angle between said elongated faces of said side blocks is less than 90° and the radially inner faces of said side blocks are disposed at an included angle substantially equal to the included angle between the elongated faces of the side blocks.

6. A synchronous machine according to claim 2 further including means disposed at axially opposite ends of said side blocks for limiting axial movement of said wedge pulling means.

7. A synchronous machine according to claim 6 wherein said wedge pulling means include a plurality of axially displaced screw threadedly engaged within a single cylindrically shaped nut.

8. A synchronous machine according to claim 7 further including insulating means fixedly secured to said coil sides in contact with said side blocks, said insulating means including means for limiting the axial travel of said side blocks.

9. A synchronous machine comprising; a stator, a rotor rotatably mounted within said stator, said rotor having a plurality of salient poles disposed around its peripheral surface, each of said poles having a coil wrapped about a body portion thereof in an underlying disposition relative to a pole tip portion, and a plurality of side supports mounted between adjacent pairs of sides of said coils, each of said side suports comprising; a pair of angularly disposed side blocks having elongated faces respectively juxtaposed with confronting sides of coils wrapped about adjacent poles, a wedge slidably mounted between said pair of side blocks, and wedge drive means operably mounted in bearing contact with said wedge and a first angularly disposed surface on each of said side blocks to draw said wedge past a second angularly disposed surface of each of the blocks by the application of force to the first angularly disposed surface of said side blocks, thereby to force said blocks against the coil sides, said wedge drive means including a screw passing radially through the wedge positioned between said second surfaces of said side blocks into threaded engagement with a nut bearing against said first angularly disposed surfaces of said side blocks and further including spring biasing means within said wedge drive means for maintaining a predetermined tension force on said screw.

* * * * *